United States Patent [19]

Kobayashi

[11] Patent Number: 5,097,708
[45] Date of Patent: Mar. 24, 1992

[54] ULTRASONIC ROTATIONAL SPEED SENSOR

[75] Inventor: Hiroshi Kobayashi, Yokohama, Japan

[73] Assignee: Nissan Motor Co., Ltd., Yokohama, Japan

[21] Appl. No.: 592,023

[22] Filed: Sep. 20, 1990

[30] Foreign Application Priority Data

Sep. 20, 1989 [JP] Japan ................................ 1-242139

[51] Int. Cl.$^5$ .......................................... G01M 13/02
[52] U.S. Cl. ...................................... 73/593; 73/627; 73/162; 324/175; 367/89
[58] Field of Search ................. 324/175; 73/628, 627, 73/593, 162; 367/89

[56] References Cited

U.S. PATENT DOCUMENTS

| | | | |
|---|---|---|---|
| 3,395,342 | 7/1968 | Pounds | 324/175 |
| 3,846,701 | 11/1974 | Sampey | 324/175 |
| 4,037,157 | 7/1977 | Campbell | 324/175 |
| 4,259,637 | 3/1981 | Bloomfield et al. | 324/175 |
| 4,650,955 | 3/1987 | Tokunaga et al. | 324/175 |

FOREIGN PATENT DOCUMENTS

| | | | |
|---|---|---|---|
| 0009104 | 1/1978 | Japan | 324/175 |
| 0040563 | 2/1990 | Japan | 73/627 |

Primary Examiner—Hezron E. Williams
Assistant Examiner—Rose M. Finley
Attorney, Agent, or Firm—Foley & Lardner

[57] ABSTRACT

An ultrasonic rotational speed sensor in which all of the various electronic devices of the sensor are arranged compactly on one side of a rotational member to be measured, while maintaining a high precision in a rotational speed measurement. In this sensor, the transmitter microphone and the receiver microphone as well as other electronic devices associated with them are arranged on the same one side of the rotational member, where the rotational speed of the rotational member is determined from a period of the ultrasonic signals transmitted from the transmitter microphone, reflected at non-notch portions of the rotational member, and received by the receiving microphone, while a direct transmission from the transmitter microphone to the receiver microphone without an interaction with the rotational member is prevented by the use of a high frequency ultrasonic signals at MHz level.

4 Claims, 3 Drawing Sheets

FIG.1
PRIOR ART
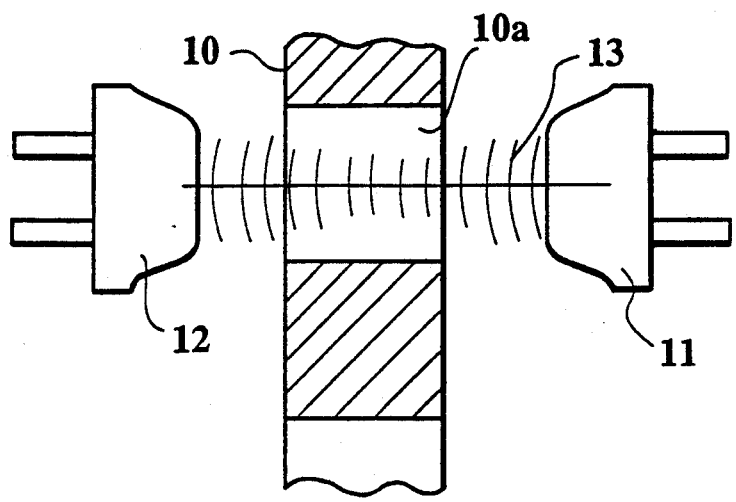
FIG.2 (A) PRIOR ART
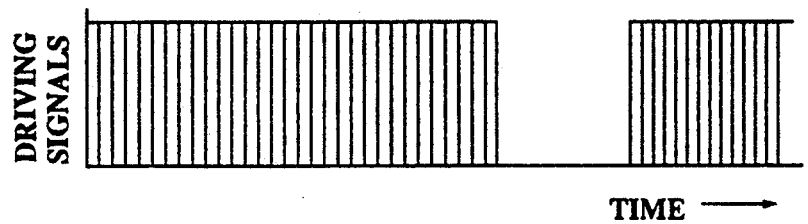
FIG.2 (B) PRIOR ART
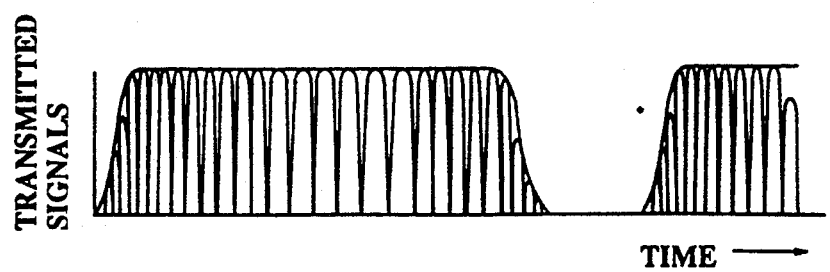
FIG.2 (C) PRIOR ART
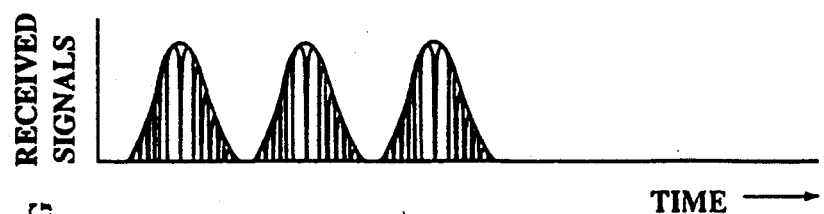
FIG.2 (D) PRIOR ART
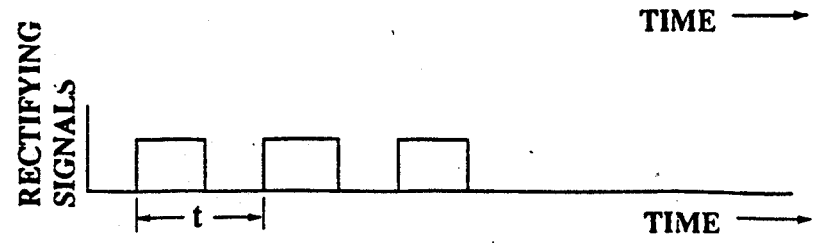

ULTRASONIC ROTATIONAL SPEED SENSOR

BACKGROUND OF THE INVENTION

1. Field of the Invention

The present invention relates to an ultrasonic rotational speed sensor, such as that used in an automobile to detect the rotational speed of wheels of the automobile.

2. Description of the Background Art

An example of a conventional ultrasonic rotational speed sensor is shown in FIG. 1. This conventional ultrasonic rotational speed sensor comprises: a disk shaped rotational member 10 having a plurality of cut out spaces like on a gear 10a formed at constant intervals along its circumference which coincides with its direction of rotation, which is only partially depicted in FIG. 1; and a transmitter microphone 11 for transmitting ultrasonic signals 13 and a receiver microphone 12 for receiving the ultrasonic signals transmitted from the transmitter microphone 11, which are arranged face to face with the rotational member 10 located therebetween. Although not depicted in FIG. 1, the transmitter microphone 11 is equipped with a signal generator for generating driving signals to be fed to the transmitter microphone 11 through a driver circuit, while the receiver microphone 12 is equipped with a pre-amplifier, a waveform rectifier, and a counter, which together form a rotational speed detection means.

In this conventional ultrasonic rotational speed sensor, the transmitter microphone 11 transmits the ultrasonic signals 13 toward the receiver microphone 12 while the rotational member 10 rotates, and only those ultrasonic signals 13 which pass through the gear cut-like portions 10a of the rotational member 10 reach the receiving microphone 12, so that the rotational speed of the rotational member 10 can be determined by detecting intervals of the ultrasonic signals 13 received by the receiving microphone 12.

Here, as shown in FIG. 2(A), the driving signals fed to the transmitter microphone 11 has a driving period which is sufficiently longer than a period of the rotational speed to be detected, where an appropriate length of non-driving period is provided between the driving periods in order to prevent an overheating of the transmitter microphone 11. For instance, in the case where the rotational speed to be detected is in a range of 60 r.p.m. to 3000 r.p.m. (equivalent to 20 msec. to 1000 msec. in terms of periods), the driving period of 5 sec. may be employed along with 1 sec. of the non-driving period, since the maximum period of the rotation is equal to 1 sec.

Then, as shown in FIG. 2(B), with a slight lag behind the driving signals, the ultrasonic signals 13 are transmitted from the transmitter microphone 11 toward the rotational member 10 as transmitted signals. The transmitted ultrasonic signals reach the receiver microphone 12 only when one of the gear cut-like portions 10a of the rotational member 10 is located on a path for the ultrasonic signals 13 formed between the transmitter microphone 11 and the receiving microphone 12. Thus, the receiving microphone 12 receives the ultrasonic signals 13 in a form of received signals shown in FIG. 2(C) which have the period synchronized with the period of the rotation of the rotational member 10. These received signals are then rectified by the waveform rectifier of the rotational speed detection means connected to the receiving microphone 12, and the rotational speed of the rotational member 10 is obtained by determining the period t of the rectified signals, as shown in FIG. 2(D).

Now, such a conventional ultrasonic rotational speed sensor has been associated with a problem of difficulty in positioning various electronic devices incorporated as elements of the rotational speed detection means connected to the receiving microphone, because the transmitter microphone and the receiving microphone are to be arranged face to face with the rotational member placed therebetween. For example, in a case of detecting the rotational speed of the wheels of an automobile, if the various electronic devices are to be arranged on a fixed substrate located on the same side as the receiving microphone, it has been necessary to take a complicated configuration such as that using slip rings for the sake of power supply to the devices and signal transmission from the devices.

SUMMARY OF THE INVENTION

It is therefore an object of the present invention to provide an ultrasonic rotational speed sensor in which the various electronic devices of the sensor, including both the transmitter microphone and the receiver microphone as well as devices associated with them, can be arranged compactly on one side of the rotational member to be measured, so that the measurement of the rotational speed can be performed in a manner of remote sensing, while at the same time preventing a direct transmission of the ultrasonic signals from the transmitter microphone to the receiver microphone without an interaction with the rotational member even in such a configuration in which the transmitter microphone and the receiver microphone are to be placed on the same side of the rotational member, so that the high precision measurement of the rotational speed can be performed.

According to one aspect of the present invention there is provided an ultrasonic rotational speed sensor, comprising: a disk shaped rotational member, which rotates in a direction along a circumference, having a plurality of gear cut-like portion formed at constant intervals along a circumference of the rotational member, and a plurality of gear tooth-like portions, each of which is formed between adjacent gear tooth-like; transmitter microphone means for transmitting ultrasonic signals of MHz level frequency toward the rotational member while the rotational member rotates, which is located on one side of the rotational member with a prescribed distance away from the rotational member; receiver microphone means for receiving the ultrasonic signals transmitted from the transmitter microphone means and reflected at the gear tooth-like portions of the rotational member, which is also located on said one side of the rotational member with said prescribed distance away from the rotational member; and means for determining a period of the ultrasonic signals received by the receiving microphone means, and determining a rotational speed of the rotating member from the determined period of the ultrasonic signals received by the receiving microphone means.

According to another aspect of the present invention there is provided a method of measuring a rotational speed of a disk shaped rotational member, which rotates in a direction along a circumference, having a plurality of gear cut-like portions formed at constant intervals along a circumference of the rotational member, and a plurality of gear tooth-like portions, each of which is formed between adjacent gear cut-like portions; the method comprising the steps of: placing transmitter microphone means for transmitting ultrasonic signals of MHz level frequency toward the rotational member while the rotational member rotates, on one side of the rotational member with a prescribed distance away from the rotational member; placing receiver microphone means for receiving the ultrasonic signals transmitted from the transmitter microphone means and reflected at the gear tooth-like portions of the rotational member, also on said one side of the rotational member with said prescribed distance away from the rotational member; and determining a period of the ultrasonic signals received by the receiving microphone means, and determining a rotational speed of the rotating member from the determined period of the ultrasonic signals received by the receiving microphone means.

Other features and advantages of the present invention will become apparent from the following description taken in conjunction with the accompanying drawings.

BRIEF DESCRIPTION OF THE DRAWINGS

FIG. 1 is a schematic illustration of an example of a conventional ultrasonic rotational speed sensor.

FIGS. 2(A), 2(B), 2(C), and 2(D) are diagrams of timing for various signals used in the conventional ultrasonic rotational speed sensor of FIG. 1.

DETAILED DESCRIPTION OF THE PREFERRED EMBODIMENTS

Figure 3:
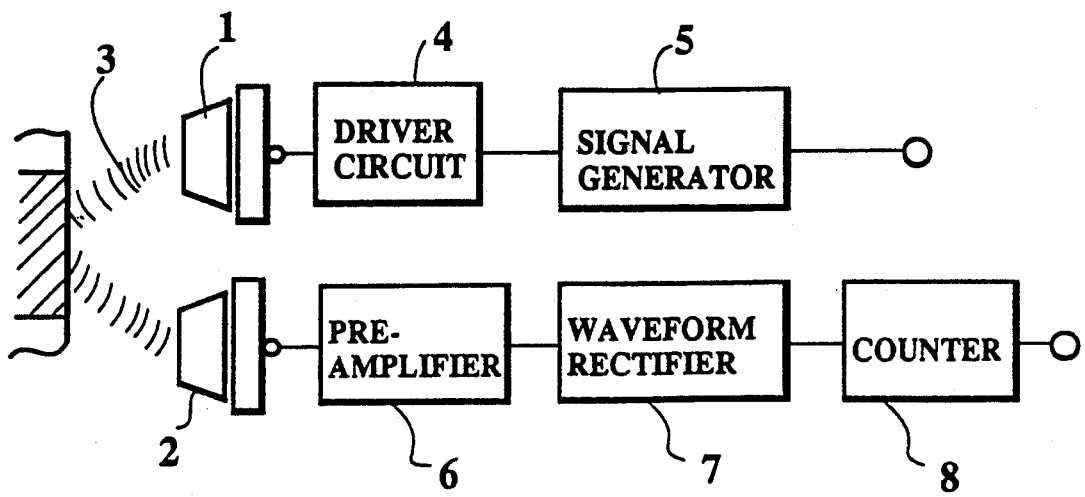
FIG. 3 is a schematic block diagram of one embodiment of an ultrasonic rotational speed sensor according to the present invention.

Referring now to FIG. 3, there is shown one embodiment of an ultrasonic rotational speed sensor according to the present invention.

In this embodiment, the ultrasonic rotational speed sensor comprises: a disk shaped rotational member 10 having a plurality of gear tooth-like 10a formed at constant intervals along its circumference which coincides with its direction of rotation, which is only partially depicted in FIG. 3; and a transmitter microphone 1 for transmitting ultrasonic signals 3 and a receiver microphone 2 for receiving the ultrasonic signals 3 transmitted from the transmitter microphone 1, which are arranged on one side of the rotational member 10 with a prescribed distance away from the rotational member 10 and a prescribed distance of separation formed therebetween, where the transmitter microphone 1 has 45° inclination in one direction with respect to the rotational member 10 while the receiver microphone 2 has 45° inclination in opposite direction with respect to the rotational member 10 such that the ultrasonic signals transmitted from the transmitter microphone 1 can be received by the receiver microphone 2 in a form of pulsed signals produced as the transmitted ultrasonic signals 3 are reflected by gear tooth-like portions of the rotational member 10.

In addition, this ultrasonic rotational speed sensor further comprises a signal generator 5 for generating driving signals to be fed to the transmitter microphone 1 through a driver circuit 4 which actually drives the transmitter microphone 1 in accordance with the driving signals; and a pre-amplifier 6, a waveform rectifier 7, and a counter 8, which together form a rotational speed detection means for determining the rotational speed of the rotational member 10 by detecting a period of the received ultrasonic signals. These elements of this ultrasonic rotational speed sensor are collectively arranged on a fixed substrate located on the same side of the rotational member 10 as the transmitter microphone 1 and the receiving microphone 2.

The transmitter microphone 1 and the receiver microphone 2 are of closed resonator type, which have a resonance frequency in a high frequency range between about 3 MHz to 7 MHz. The use of such a high resonance frequency gives a high directivity for the ultrasonic signals transmitted between these microphones, and keeps a so called half level half angle (an angle from a central axis to a point at which the sound level diminishes by 6dB from that on the central axis) to about 2° so that the ultrasonic signals 3 can be transmitted along a substantially straight line. For this reason, even in this configuration in which the transmitter microphone 1 and the receiver microphone 2 are placed on the same side of the rotational member, it is possible to prevent a direct transmission of the ultrasonic signals from the transmitter microphone 1 to the receiver microphone 2 without an interaction with the rotational member 10, while performing the measurement of the rotational speed in a manner of remote sensing.

Now, a relationship between a frequency of the ultrasonic signals 3 and the distance from the rotational member 10 to the transmitter microphone 1 and the receiver microphone 2 will be explained in detail.

Figure 4:
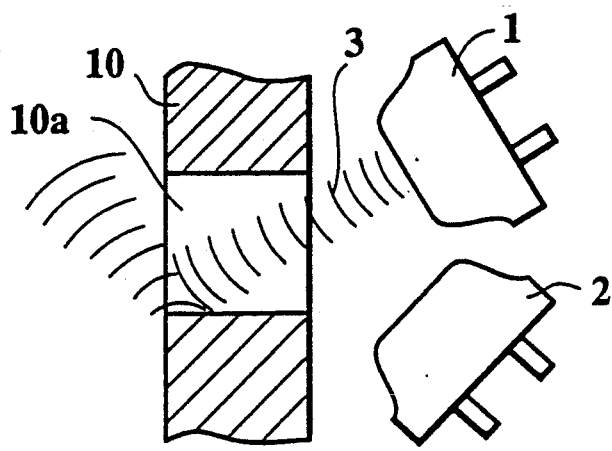
FIGS. 4(A) and 4(B) are schematic illustrations of the ultrasonic rotational speed sensor of FIG. 3 in two stages of its operation.
Figure 4:
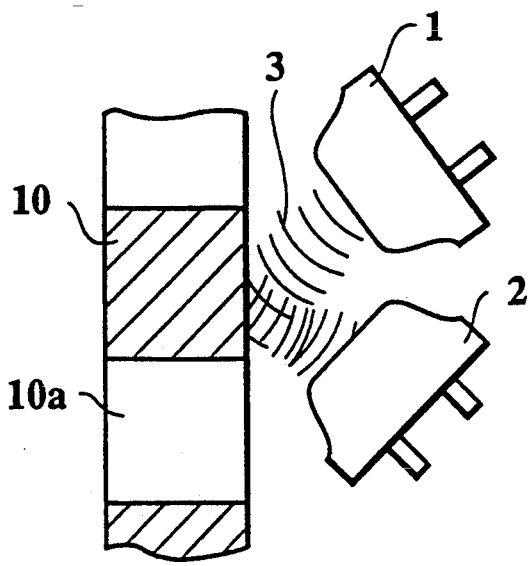

First, a case in which the ultrasonic signals 3 transmitted from the transmitter microphone 1 pass through one of the gear cut-like portions 10a of the rotational member 10, as shown in FIG. 4(A), is considered. In this case, because the transmitted ultrasonic signals 3 are those belonging to the high frequency range at MHz level, by an appropriate arrangement, the ultrasonic signals 3 can be made to dissipate in a course of transmission before passing through the rotational member 10. For example, when the distance from the rotational member 10 to the transmitter microphone 1 and the receiver microphone 2 is set to 1 mm, with the 45° inclination of the transmitter microphone 1 and the receiver microphone 2 with respect to the rotational member 10, a separation between the transmitter microphone 1 and the receiver microphone 2 have to be 2 mm, and a distance which the ultrasonic signals 3 have to travel from the transmitter microphone 1 to the receiver microphone 2 by being reflected at the gear tooth-like portions of the rotational member 10 is equal to $2\sqrt{2} \approx 2.8$ mm. Thus, it is sufficient for the ultrasonic signals 3 to be able to travel for about 5 mm. Now, by setting the frequency of the ultrasonic signals 3 to 5 MHz, the limit of the distance for which the ultrasonic signals 3 can travel can be set to 5 mm. Then, if a thickness of the rotational member 10 is made equal to 3 mm, a distance from the transmitter microphone 1 to the opposite side of the rotational member 10 is equal to $\sqrt{2} + 3\sqrt{2} + = 4\sqrt{2} \approx 5.6$ mm, so that the ultrasonic signals 3 of 5 MHz frequency will dissipate before reaching to the opposite side of the rotational member 10.

On the other hand, in a case in which the ultrasonic signals 3 transmitted from the transmitter microphone 1 are reflected at the gear tooth-like portions of the rotational member 10, as shown in FIG. 4(B), the distance that the ultrasonic signals 3 travel is equal to $2\sqrt{2} \approx 2.8$ mm as mentioned above, so that the receiver microphone 2 can receive the ultrasonic signals 3 before they dissipate away.

By the similar consideration, when the distance from the rotational member 10 to the transmitter microphone 1 and the receiver microphone 2 is set to 2 mm, with otherwise the same configuration as in the above case, an appropriate frequency for the ultrasonic signals 3 can be determined as 3 MHz.

Next, the operation of this ultrasonic rotational speed sensor will be described with references to FIGS. 5(A), 5(B), 5(C), and 5(D).

First, the driving signals for driving the transmitter microphone 1 at a prescribed MHz level frequency are generated by the signal generator 5, and the generated driving signals are fed to the driver circuit 4 which in response drives the transmitter microphone 1 at this prescribed MHz level frequency. Here, as shown in FIG. 5(A), the driving signals fed to the transmitter microphone 1 have a driving period which is sufficiently longer than a period of the rotational speed to be detected, where an appropriate length of non-driving period is provided between the driving periods in order to prevent an overheating of the transmitter microphone 1.

Figure 5:
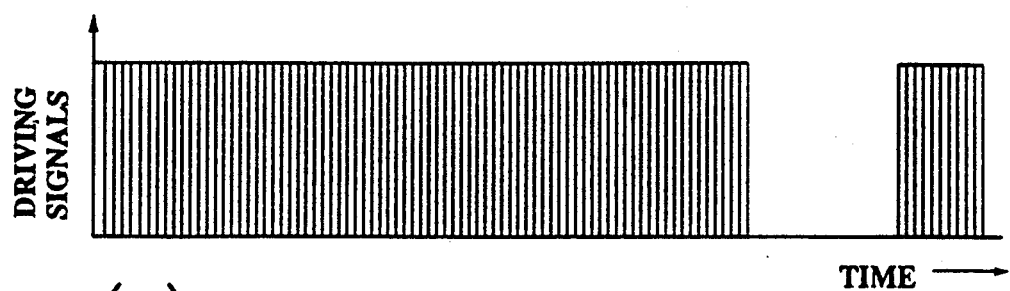
FIGS. 5(A), 5(B), 5(C), and 5(D) are diagrams of timing for various signals used in the ultrasonic rotational speed sensor of FIG. 3.
Figure 5:
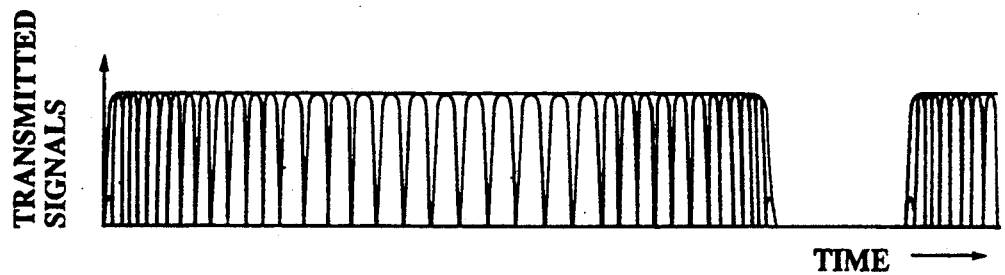
Figure 5:
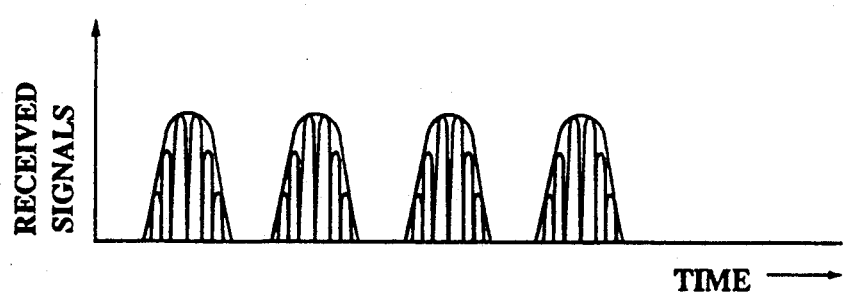
Figure 5:
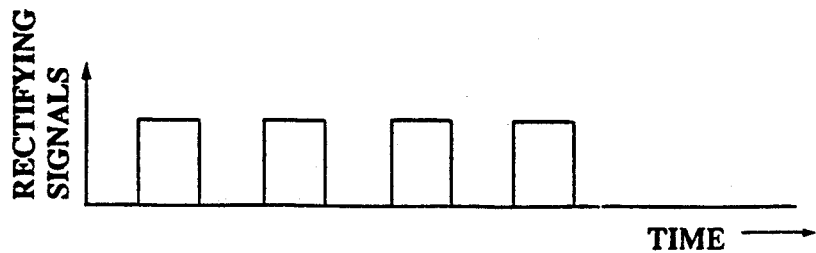

Then, as shown in FIG. 5(B), with a slight lag behind the driving signals, the ultrasonic signals 3 of that prescribed MHz level frequency are transmitted from the transmitter microphone 1 toward the rotational member 10 as transmitted signals, while the rotational member 10 rotates.

The transmitted ultrasonic signals 3 reach the receiver microphone 2 by being reflected at the rotational member 10 only when they incident on the gear tooth-like portions of the rotational member 10. Here, because the ultrasonic signals 3 at MHz frequency level have a sufficiently high directivity to make the ultrasonic signals to transmit along a substantially straight line, a direct transmission of the ultrasonic signals from the transmitter microphone 1 to the receiver microphone 2 without an interaction with the rotational member 10 can be avoided.

Thus, the receiving microphone 2 receives the ultrasonic signals 3 in a form of pulsed received signals shown in FIG. 5(C) which have the period synchronized with the period of the rotation of the rotational member 10.

These received ultrasonic signals 3 are then converted into electric signals at the receiving microphone 2, amplified by the pre-amplifier 6, and rectified by the waveform rectifier 7, to obtain the rectified signals as shown in FIG. 5(D). Finally, the rotational speed of the rotational member 10 is obtained by determining the period t of the rectified signals by means of a counting operation at the counter 8.

As described, according to the present invention, it is possible to provide an ultrasonic rotational speed sensor in which the various electronic devices of the sensor, including both the transmitter microphone and the receiver microphone as well as devices associated with them, can be arranged compactly on one side of the rotational member to be measured, while at the same time preventing a direct transmission of the ultrasonic signals from the transmitter microphone to the receiver microphone without an interaction with the rotational member even in such a configuration, because of the use of the ultrasonic signals of the high frequency at MHz level. As a consequence, it becomes possible to perform the measurement of the rotational speed in a manner of remote sensing, with the high precision, without introducing any complication in the configuration of the ultrasonic rotational speed sensor itself.

What is claimed is:

1. An ultrasonic rotational speed sensor, comprising:
   a disk shaped rotational member, which rotates in a direction along a circumference, having a plurality of gear cut-like portions formed at constant intervals along a circumference of the rotational member, and a plurality of gear tooth-like portions, each of which is formed between adjacent gear cut-like portions;
   transmitter microphone means for transmitting ultrasonic signals of MHz level frequency toward the rotational member while the rotational member rotates, which is located on one side of the rotational member with a prescribed distance away from the rotational member;
   receiver microphone means for receiving the ultrasonic signals transmitted from the transmitter microphone means and reflected at the gear tooth-like portions of the rotational member, which is also located on said one side of the rotational member with said prescribed distance away from the rotational member;
   means for determining a period of the ultrasonic signals received by the receiving microphone means, and determining a rotational speed of the rotating member from the determined period of the ultrasonic signals received by the receiving microphone means;
   wherein a value of the MHz level frequency of the ultrasonic signals and the prescribed distance from the rotational member to the transmitting microphone means and the receiving microphone means are selected such that those ultrasonic signals transmitted from the transmitter microphone means which are incident on one of the gear cut-like portions of the rotational member dissipate away before passing through said one of the gear cut-like portions, whereas those ultrasonic signals transmitted from the transmitter microphone means which are incident on one of the gear tooth-like portions of the rotational member are received by the receiving microphone means before the ultrasonic signals dissipate away.

2. The ultrasonic rotational speed sensor of claim 1, wherein the transmitter microphone means has a prescribed angle of inclination in one direction with respect to the rotational member, while the receiver microphone means has said prescribed angle of inclination in a direction opposite to said one direction with respect to the rotational member.

3. A method of measuring a rotational speed of a disk shaped rotational member, which rotates in a direction along a circumference, having a plurality of gear cut-like portions formed at constant intervals along a circumference of the rotational member, and a plurality of gear tooth-like portions, each of which is formed between adjacent notches, the method comprising the steps of:
   placing transmitter microphone means for transmitting ultrasonic signals of MHz level frequency toward the rotational member while the rotational member rotates, on one side of the rotational member at a prescribed distance away from the rotational member;

placing receiver microphone means for receiving the ultrasonic signals transmitted from the transmitter microphone means and reflected at the gear tooth-like portions of the rotational member, also on said one side of the rotational member at said prescribed distance away from the rotational member; and determining a period of the ultrasonic signals received by the receiving microphone means, and determining a rotational speed of the rotating member from the determined period of the ultrasonic signals received by the receiving microphone means;

wherein a value of the MHz level frequency of the ultrasonic signals and the prescribed distance from the rotational member to the transmitting microphone means and the receiving microphone means are selected such that those ultrasonic signals transmitted from the transmitter microphone means which are incident on one of the gear cut-like portions of the rotational member dissipate away before passing through said one of the gear cut-like portions, whereas those ultrasonic signals transmitted from the transmitter microphone means which are incident on one of the gear tooth-like portions of the rotational member are received by the receiving microphone means before the ultrasonic signals dissipate away.

4. The method of claim 3, wherein the transmitter microphone means has a prescribed angle of inclination in one direction with respect to the rotational member, while the receiver microphone means has said prescribed angle of inclination in a direction opposite to said one direction with respect to the rotational member.

* * * * *